(12) United States Patent
Nishii et al.

(10) Patent No.: US 7,344,655 B1
(45) Date of Patent: Mar. 18, 2008

(54) COOLANT, METHOD OF ENCLOSING COOLANT, AND COOLING SYSTEM

(75) Inventors: Mikito Nishii, Aichi-ken (JP);
Masamine Tanikawa, Okazaki (JP);
Hisanori Watanabe, Shimizu (JP);
Yoshihisa Kurokawa, Shizuoka (JP);
Satoshi Sugiyama, Shimizu (JP);
Kazuhito Yaeda, Shimizu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/049,816

(22) PCT Filed: Sep. 27, 2000

(86) PCT No.: PCT/JP00/06683

§ 371 (c)(1),
(2), (4) Date: Feb. 19, 2002

(87) PCT Pub. No.: WO01/23495

PCT Pub. Date: Apr. 5, 2001

(30) Foreign Application Priority Data

Sep. 28, 1999 (JP) .................................. 11-273813
Jun. 13, 2000 (JP) .............................. 2000-176464

(51) Int. Cl.
*C09K 5/10* (2006.01)
(52) U.S. Cl. ........................................................ 252/75
(58) Field of Classification Search ................... 252/68, 252/75
See application file for complete search history.

(56) References Cited

U.S. PATENT DOCUMENTS

| | | | |
|---|---|---|---|
| 3,507,702 A | | 4/1970 | Sanderson |
| 3,964,930 A | | 6/1976 | Reiser |
| 4,354,949 A | * | 10/1982 | Eggers et al. .................. 252/39 |
| 4,774,351 A | * | 9/1988 | Forsberg ..................... 558/207 |
| 5,534,172 A | * | 7/1996 | Perry et al. .................. 508/156 |
| 6,083,311 A | * | 7/2000 | Kanbayashi et al. ..... 106/31.65 |
| 6,235,348 B1 | * | 5/2001 | Shimizu et al. .......... 427/388.1 |

FOREIGN PATENT DOCUMENTS

| | | |
|---|---|---|
| CA | 2344856 | 9/1999 |
| GB | 0 564 721 A1 | 10/2003 |
| JP | 52-94880 | 8/1977 |
| JP | A 52-94880 | 8/1977 |
| JP | 54-39389 | 3/1979 |
| JP | A 54-39389 | 3/1979 |
| JP | A-56-032581 | 4/1981 |
| JP | A 56-32581 | 4/1981 |
| JP | 58-28311 | 6/1983 |
| JP | 62-045681 A * | 2/1987 |
| JP | A-02-021572 | 1/1990 |

(Continued)

*Primary Examiner*—John R. Hardee
(74) *Attorney, Agent, or Firm*—Oliff & Berridge, PLC

(57) ABSTRACT

A coolant used for cooling down a stack of fuel cells includes: a solution mixture of water and a glycol as base material; and a rust-preventive additive that functions to keep an electric conductivity of the coolant at a low level and to maintain a hydrogen ion exponent of the coolant in a substantially neutral level. The rust-preventive agent includes at least one of an alkaline ethanolamine additive, such as triethanolamine, diethanolamine, or monoethanolamine, and an acidic additive selected among the group consisting of triazole compounds, phosphoric acid compounds, and organophosphoric acid compounds.

8 Claims, 6 Drawing Sheets

FOREIGN PATENT DOCUMENTS

| | | | |
|---|---|---|---|
| JP | A 2-21572 | 1/1990 |
| JP | 04-279690 | 10/1992 |
| JP | A 4-279690 | 10/1992 |
| JP | 5-202493 A | 8/1993 |
| JP | U 6-54207 | 7/1994 |
| JP | 6-223852 | 8/1994 |
| JP | A-07-188953 | 7/1995 |
| JP | A-09-035239 | 2/1997 |
| JP | A-09-092315 | 4/1997 |
| JP | 2706178 | 10/1997 |
| JP | B2-2706198 | 10/1997 |
| JP | A-10-060675 | 3/1998 |
| JP | A 10-208764 | 8/1998 |
| JP | 10-324982 A | 12/1998 |
| SU | 899635 B | * | 1/1982 |
| WO | WO 98/40441 | * | 9/1998 |

* cited by examiner

Fig. 1

| | | Ex. 1 | Ex. 2 | Ex. 3 | Ex. 4 | Ex. 5 | Ex. 6 | Ex. 7 | Ex. 8 | Ex. 9 | Comparative Ex. 1 | Comparative Ex. 2 | Comparative Ex. 3 | Comparative Ex. 4 | Comparative Ex. 5 | Comparative Ex. 6 |
|---|---|---|---|---|---|---|---|---|---|---|---|---|---|---|---|---|
| Base Materials | Ethylene glycol | 50.00 | 50.00 | 50.00 | 50.00 | 50.00 | 50.00 | 50.00 | 50.00 | 50.00 | 50.00 | 50.00 | - | - | - | - |
| | Propylene glycol | - | - | - | - | - | - | - | - | - | - | - | 50.00 | - | - | - |
| | Glycerol | - | - | - | - | - | - | - | - | - | - | - | 50.00 | 50.00 | - | - |
| | Ion exchanged water | 48.90 | 49.655 | 49.90 | 49.95 | 49.90 | 49.90 | 49.50 | 49.90 | 49.90 | 46.78 | 50.00 | - | 50.00 | - | 100.00 |
| | Tap water | - | - | - | - | - | - | - | - | - | - | - | - | - | 100.00 | - |
| Additives | Quercetin | - | - | - | 0.05 | - | - | - | - | - | - | - | - | - | - | - |
| | Glucose (Grape sugar) | - | - | - | - | 0.10 | - | - | - | - | - | - | - | - | - | - |
| | Maltose (Malt sugar) | - | - | - | - | - | 0.10 | 0.50 | - | - | - | - | - | - | - | - |
| | Alkyl glucoside | - | - | - | - | - | - | - | 0.10 | - | - | - | - | - | - | - |
| | POE sorbitan monopalmitate | - | - | - | - | - | - | - | - | 0.10 | - | - | - | - | - | - |
| | Triethanolamine | 1.00 | 0.34 | - | - | - | - | - | - | - | - | - | - | - | - | - |
| | Ortho-phosphoric acid | 0.10 | - | - | - | - | - | - | - | - | 0.20 | - | - | - | - | - |
| | Phosphonoic acid | - | 0.005 | - | - | - | - | - | - | - | - | - | - | - | - | - |
| | Benzotriazole | - | - | 0.10 | - | - | - | - | - | - | 0.10 | - | - | - | - | - |
| | Sodium nitrate | - | - | - | - | - | - | - | - | - | 0.10 | - | - | - | - | - |
| | Sodium molybdate | - | - | - | - | - | - | - | - | - | 0.20 | - | - | - | - | - |
| | Sodium benzoate | - | - | - | - | - | - | - | - | - | 2.50 | - | - | - | - | - |
| | Sodium hydroxide | - | - | - | - | - | - | - | - | - | 0.12 | - | - | - | - | - |
| Hydrogen ion exponent (pH) | | 8.1 | 8.1 | 6.2 | 7~8 | 7~8 | 7~8 | 7~8 | 7~8 | 7~8 | 7.3 | 6.8 | 6.8 | 6.8 | 6~7 | 6~7 |

Fig. 2

| | Ex. 1 | Ex. 2 | Ex. 3 | Ex. 4 | Ex. 5 | Ex. 6 | Ex. 7 | Ex. 8 | Ex. 9 | Comparative Ex. 1 | Comparative Ex. 2 | Comparative Ex. 3 | Comparative Ex. 4 | Comparative Ex. 5 | Comparative Ex. 6 |
|---|---|---|---|---|---|---|---|---|---|---|---|---|---|---|---|
| Electric conductivity ($\mu$S/cm) | 2.90 | 5.0 | 2.1 | 5.3 | 3.6 | 3.5 | 5.0 | 3.2 | 4.4 | 5950 | 3.5 | 1.6 | 1.8 | 286 | 0.88 |
| Metal corrosion resistance Air n=2 Quantity of corrosion of Al (mg/cm$^2$) | 0.01 | -0.04 | 0.04 | -0.02 | -0.02 | -0.03 | 0.00 | — | — | -0.02 | -0.12 | -0.12 | — | -0.52 | 0.10 |
| | -0.01 | -0.04 | 0.15 | 0.01 | -0.02 | -0.01 | -0.02 | — | — | -0.03 | -0.10 | -0.09 | — | -0.43 | 0.10 |
| Metal corrosion resistance N$_2$ n=2 Quantity of corrosion of Al (mg/cm$^2$) | 0.00 | — | 0.04 | — | — | — | — | — | — | — | — | 0.02 | — | — | — |
| | -0.01 | — | 0.05 | — | — | — | — | — | — | — | — | 0.04 | — | — | — |
| Passivation current density N$_2$ ($\mu$A/cm$^2$) | 4.8 | 11 | 2.4 | (7) | (15) | (16) | (16) | (60) | (80) | — | (100) | (100) | (100) | — | — |
| Passivation current density Air ($\mu$A/cm$^2$) | 2.4 | 12 | 2.4 | — | — | — | — | — | — | 3.0 | 2.0 | 1.3 | — | 210 | — |
| Freezing point (°C) | -35 | -35 | -35 | -35 | -35 | -35 | -35 | -35 | -35 | -35 | -35 | -35 | — | 0 | 0 |

COOLANT, METHOD OF ENCLOSING COOLANT, AND COOLING SYSTEM

TECHNICAL FIELD

The present invention relates to a coolant, a method of enclosing a coolant, and a cooling system utilizing a coolant. More specifically the present invention relates to a coolant for cooling a stack of fuel cells, a method of enclosing a coolant in a cooling circuit of a fuel cells cooling system, and a cooling system for a stack of fuel cells.

BACKGROUND ART

A stack of fuel cells generally has a laminate structure of multiple unit cells. One cooling plate is disposed between each pair of adjoining sub-stacks, each sub-stack consisting of plural unit cells, to cool the stack (unit cells). A flow path of a coolant is formed in the cooling plate, and the flow of the coolant through the coolant flow path cools down the stack. The coolant for the fuel cells is circulated in the stack that carries out power generation, that is, between each pair of adjoining sub-stacks. In order to prevent a decrease in power generation efficiency (that is, to reduce energy loss) due to the leak to the outside of the stack and the resistance of the coolant, the coolant is required to have high insulation performance. The prior art technique applies pure water for the coolant, in order to satisfy the requirements of ensuring the sufficient insulation performance and the sufficient cooling efficiency. The coolant for the stack of fuel cells is further required to have rust resistance, with a view to extending the life of the cooling plates. The general countermeasure to meet this requirement applies stainless steel material having high rust resistance for the cooling plates. Another proposed technique adds iron ions to the coolant as discussed in JAPANESE PATENT LAID-OPEN GAZETTE No. 2-21572.

Such proposed techniques have effects on the stationary, installed medium-sized or large-sized fuel cells and the continuous-driving fuel cells, but do not have sufficient effects on the portable small-sized fuel cells and the intermittent-driving fuel cells, such as fuel cells mounted on the vehicle.

In the case of the intermittent-driving, portable fuel cells, the coolant in the non-working state is cooled down to the environmental temperature. The coolant is accordingly required to have unfreezing performance under the condition that the environmental temperature is below the freezing point. Freezing the coolant may damage a cooling circuit including the cooling plates. The damaged cooling circuit may lead to insufficient performances of the fuel cells.

In order to ensure the unfreezing performance, a coolant for cooling an internal combustion engine may be used as the unfreezing coolant. The coolant for cooling the internal combustion engine is, however, intrinsically used in the parts with no power generation and is not required to have low electric conductivity. Namely such a coolant has extremely high electric conductivity. The electric current flows through a cooling pipe in the stack of fuel cells. The high electric conductivity of the coolant accordingly causes the power generated by the fuel cells to flow into the coolant. This leads to an undesirable power loss. The coolant for cooling the internal combustion engine is accordingly unsuitable as the coolant for cooling the stack of fuel cells.

In the case of the portable fuel cells mounted on the vehicle, reduction in total weight of a fuel cells system including the cooling circuit is an important issue. For the purpose of reduction in weight, it is expected to use a light metal having high heat conductivity, such as aluminum material, for the cooling plates and a heat exchanger. The light metal, however, generally does not have so high rust resistance as that of the stainless steel material, so that the coolant itself is required to have rust resistance.

The object of the present invention is thus to solve the problems of the prior art techniques discussed above and to provide a coolant for a stack of fuel cells having low electric conductivity, rust-preventing ability, high transmission ability, and unfreezing performance.

DISCLOSURE OF THE INVENTION

In order to attain the above and the other related objects, a first application of the present invention is a coolant including: a water-containing base material; and a rust-preventive additive that functions to keep an electric conductivity of the coolant at a low level and to maintain a hydrogen ion exponent of the coolant in a substantially neutral level.

The first application of the present invention gives the coolant satisfying the required low electric conductivity, rust-preventing ability, high transmission ability, and unfreezing performance.

In the coolant according to the first application of the present invention, the base material may be a solution containing a glycol. The rust-preventive additive may include at least one of an alkalescent additive and an acidulous additive, or may include an alkaline additive and an acidic additive. The alkaline additive may be an ethanolamine. The ethanolamine may include triethanolamine, diethanolamine, and monoethanolamine.

In one preferable embodiment of the coolant according to the first application of the present invention, the acidic additive is selected out of the group consisting of triazole compounds, phosphoric acid compounds, and organophosphoric acid compounds. The rust-preventive additive may cause the coolant to have a hydrogen ion exponent of about 6 to 9, or may cause the coolant to have a low electric conductivity of less than about 100 μS/cm. It is preferable that the rust-preventive additive especially has rust-preventive performance against aluminum material.

In another preferable embodiment of the coolant according to the first application of the present invention, the rust-preventive additive is a nonionic substance. The nonionic substance may be at least one of the saccharide and a nonionic surfactant. It is preferable that the coolant is decontaminated by a coolant decontamination system using either one of an ion exchange resin and a chelating resin. The coolant may have undergone deoxidation. In the case where a nonionic substance is used as the rust-preventive additive, the rust-preventive additive is not ionized in the coolant. The ion exchange resin or the chelating resin is applied to easily remove only the ionized impurities. The deoxidation effectively prevents deterioration of the quality of the coolant over a long time period.

A second application of the present invention is a method of enclosing the coolant according to the first application of the present invention in a cooling circuit for a stack of fuel cells. This method includes the steps of: deoxidizing the coolant; and enclosing the deoxidized coolant with an inert gas in the cooling circuit.

The second application of the present invention effectively prevents deterioration of the quality of the coolant in the cooling circuit over a long time period.

A third application of the present invention is a cooling system for a stack of fuel cells. The cooling system includes: the coolant according to the first application of the present invention; and a cooling circuit in which the coolant and an inert gas are enclosed.

The cooling system according to the third application of the present invention attains the required low electric conductivity, rust-preventing ability, high transmission ability, and unfreezing performance. This arrangement effectively prevents deterioration of the quality of the coolant in the cooling circuit over a long time period.

A fourth application of the present invention is a method of decontaminating a coolant. The method according to the fourth application of the present invention includes the steps of: preparing a water-containing base material; preparing a rust-preventive additive that functions to keep an electric conductivity of the coolant at a low level and to maintain a hydrogen ion exponent of the coolant in a substantially neutral level; and removing only deteriorating substances from the coolant, which is obtained by mixing the rust-preventive additive with the base material, with either one of an ion exchange resin and a chelating resin at regular intervals.

The method of decontaminating a coolant according to the fourth application of the present invention effectively prevents deterioration of the quality of the coolant, which satisfies the required low electric conductivity, rust-preventing ability, high transmission ability, and unfreezing performance, over a long time period. One of glycols may be used in addition to water for the base material. One of nonionic substances may be used for the rust-preventive additive.

BRIEF DESCRIPTION OF THE DRAWINGS

FIG. 1 is a table showing the composition and hydrogen ion exponent (pH) of diverse coolants used as Examples 1 through 9 according to the present invention and the composition and pH of other coolants used as Comparative Examples 1 through 6;

FIG. 2 is a table showing results of various tests with regard to Examples 1 through 9 and Comparative Examples 1 through 6 enumerated in FIG. 1;

BEST MODES OF CARRYING OUT THE INVENTION

First Embodiment

Figure 3:
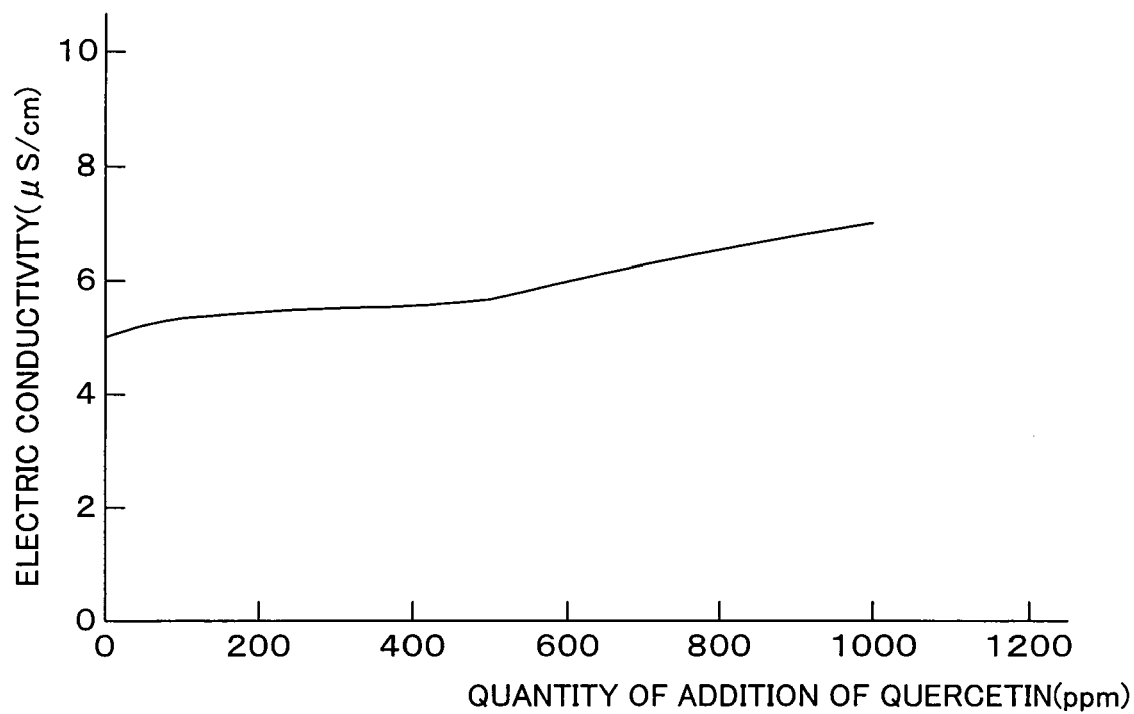
FIG. 3 is a graph showing a variation in electric conductivity due to addition of quercetin to a 50% diluted solution of ethylene glycol.

The following describes coolants according to the present invention with reference to FIGS. 1 and 2.

The characteristics of various coolants are discussed first with referring to FIG. 1. FIG. 1 is a table showing the composition and hydrogen ion exponent (pH) of diverse coolants used as Examples 1 through 9 according to the present invention and the composition and pH of other coolants used as Comparative Examples 1 through 6. FIG. 2 is a table showing results of various tests performed on the coolants of Examples 1 through 9 and Comparative Examples 1 through 6 enumerated in FIG. 1. In the table of FIG. 1, Examples 1 through 9 are expressed as Ex. 1 to Ex. 9.

The coolant of Example 1 includes ethylene glycol (50% by weight) and ion exchanged water (48.9% by weight) as base material and triethanolamine (1.0% by weight) and ortho-phosphoric acid (0.1% by weight) as rust-preventive additives. Ethylene glycol, as well as propylene glycol, is one of glycols and is known as the substance that gives unfreezing properties to a solution. The solution of ion exchanged water and a glycol used as the base material has excellent heat conductivity, as clearly understood from the fact that this solution is generally used as the coolant for internal combustion engines of vehicles.

Triethanolamine, one of ethanolamines, is an alkaline rust-preventive agent, whereas ortho-phosphoric acid, one of phosphoric acid compounds, is an acidic rust-preventive agent. The coolant of Example 1 has pH of 8.1. In order to ensure the sufficient rust-preventive performance and suppress the electric conductivity, the allowable addition range of triethanolamine is 0.1 to 3.0% by weight, and the allowable addition range of ortho-phosphoric acid is 0.1 to 1.0% by weight. In this example, the total composition is adjusted to 100% by weight by regulating the percent by weight of ion exchanged water. Another ethanolamine, such as monoethanolamine or diethanolamine, may replace triethanolamine, whereas another phosphoric acid compound may replace ortho-phosphoric acid.

The coolant of Example 2 includes ethylene glycol (50% by weight) and ion exchanged water (49.655% by weight) as base material and triethanolamine (0.34% by weight) and phosphonic acid (0.005% by weight) as rust-preventive additives. Phosphonic acid, one of the organophosphoric acid compounds, is an acidic rust-preventive agent. The coolant of Example 2 has pH of 8.1. In order to ensure the sufficient rust-preventive performance and suppress the electric conductivity, the allowable addition range of triethanolamine is 0.1 to 3.0% by weight, and the allowable addition range of phosphonic acid is 0.001 to 0.01% by weight. In this example, the total composition is adjusted to 100% by weight by regulating the percent by weight of ion exchanged water. Another ethanolamine, such as monoethanolamine or diethanolamine, may replace triethanolamine, whereas another organophosphoric acid compound may replace phosphonic acid.

The coolant of Example 3 includes ethylene glycol (50% by weight) and ion exchanged water (49.9% by weight) as base material and benzotriazole (0.1% by weight) as a rust-preventive additive. Benzotriazole, one of triazole compounds, is an acidic rust-preventive agent. The coolant of Example 3 has pH of 6.2. In order to ensure the sufficient rust-preventive performance and suppress the electric conductivity, the allowable addition range of benzotriazole is 0.1 to 0.6% by weight. In this example, the total composition is adjusted to 100% by weight by regulating the percent by weight of ion exchanged water. Another triazole may replace benzotriazole.

The coolants of Examples 4 to 9 discussed below are characterized by application of nonionic substances, which are not ionized in aqueous solutions, for the rust-preventive agent. The nonionic substances include saccharides and nonionic surfactants.

The coolant of Example 4 includes ethylene glycol (50% by weight) and ion exchanged water (49.95% by weight) as base material and quercetin (3,3',4',5,7-pentahydroxyflavone) (0.05% by weight), which is a nonionic substance and one of glycosides, as a rust-preventive additive. The coolant of Example 4 has pH of 7 to 8. In order to ensure the sufficient rust-preventive performance and suppress the electric conductivity, the allowable addition range of quercetin is 0.005 to 0.2% by weight. In this example, the total composition is adjusted to 100% by weight by regulating the percent by weight of ion exchanged water.

The coolant of Example 5 includes ethylene glycol (50% by weight) and ion exchanged water (49.90% by weight) as base material and glucose (0.10% by weight), which is one of monosaccharides, as a rust-preventive additive. The coolant of Example 5 has pH of 7 to 8. In order to ensure the sufficient rust-preventive performance and suppress the electric conductivity, the allowable addition range of glucose is 0.05 to 0.5% by weight. In this example, the total composition is adjusted to 100% by weight by regulating the percent by weight of ion exchanged water.

The coolant of Example 6 includes ethylene glycol (50% by weight) and ion exchanged water (49.90% by weight) as base material and maltose (0.10% by weight), which is one of oligosaccharides, as a rust-preventive additive. The coolant of Example 6 has pH of 7 to 8.

The coolant of Example 7 includes ethylene glycol (50% by weight) and ion exchanged water (49.50% by weight) as base material and maltose (0.50% by weight), which is one of oligosaccharides, as a rust-preventive additive. The coolant of Example 7 has pH of 7 to 8.

The coolant of Example 8 includes ethylene glycol (50% by weight) and ion exchanged water (49.90% by weight) as base material and alkyl glucoside (0.10% by weight), which is one of nonionic surfactants, as a rust-preventive additive. The coolant of Example 8 has pH of 7 to 8. In order to ensure the sufficient rust-preventive performance and suppress the electric conductivity, the allowable addition range of alkyl glucoside is 0.05 to 0.5% by weight. In this example, the total composition is adjusted to 100% by weight by regulating the percent by weight of ion exchanged water.

The coolant of Example 9 includes ethylene glycol (50% by weight) and ion exchanged water (49.90% by weight) as base material and polyoxyethylene (POE) sorbitan monopalmitate (0.10% by weight), which is one of nonionic surfactants, as a rust-preventive additive. The coolant of Example 9 has pH of 7 to 8. In order to ensure the sufficient rust-preventive performance and suppress the electric conductivity, the allowable addition range of POE sorbitan monopalmitate is 0.05 to 0.5% by weight. In this example, the total composition is adjusted to 100% by weight by regulating the percent by weight of ion exchanged water.

In fuel cells mounted on a vehicle, aluminum or an aluminum alloy is generally used as the material of cooling panels and a heat exchanger in a cooling circuit. The embodiment of the present invention thus gives specific consideration to corrosion resistance to the aluminum-containing materials. Reduction in weight and cost is required for the fuel cells mounted on the vehicle. The aluminum material, which is widely applied for car radiators, is expected as the suitable material that fulfills such requirements.

The respective rust-preventive additives used in Examples 1 to 9 are only illustrative, but any rust-preventive agents having favorable rust-preventive performances against the aluminum material. In the case of selection of a material other than the aluminum material, a rust-preventive agent having rust-preventive performance against the selected material should be used.

The coolant of Comparative Example 1 is a coolant generally used for cooling internal combustion engines of automobiles, and includes ethylene glycol (50% by weight) and ion exchanged water (46.78% by weight) as base material and ortho-phosphoric acid (0.2% by weight), benzotriazole (0.1% by weight), sodium nitrate (0.1% by weight), sodium molybdate (0.2% by weight), sodium benzoate (2.5% by weight), and sodium hydroxide (0.12% by weight). The coolant of Comparative Example 1 has pH of 7.3.

The coolant of Comparative Example 2 includes ethylene glycol (50% by weight) and ion exchanged water (50% by weight). This was used for discussion on the characteristics of the ethylene glycol-ion exchanged water system without any rust-preventive agent. The coolant of Comparative Example 2 has pH of 6.8.

The coolant of Comparative Example 3 includes propylene glycol (50% by weight) and ion exchanged water (50% by weight). This was used for discussion on the characteristics of the propylene glycol-ion exchanged water system without any rust-preventive agent. The coolant of Comparative Example 3 has pH of 6.8.

The coolant of Comparative Example 4 includes glycerol (50% by weight) and ion exchanged water (50% by weight), and was used for the purpose of comparison.

Comparative Example 5 is typical tap water (100% by weight) and was used for discussion on the characteristics of tap water.

Comparative Example 6 is ion exchanged water (100% by weight) conventionally used as a coolant for cooling fuel cells and was used for the purpose of comparison.

In the respective Examples and Comparative Examples, pH was regulated to the range of 6 to 9 without using any pH regulator (for example, potassium hydroxide) but by controlling the quantity of addition of the rust-preventive agent. pH was measured with a commercially available pH meter at 25° C.

The results of various tests are discussed with referring to FIG. 2. FIG. 2 is a table showing results of various tests with regard to Examples 1 through 9 and Comparative Examples 1 through 6 enumerated in FIG. 1.

The results of a test for the electric conductivity (μS/cm) are discussed first. The electric conductivity test places two electrodes in each coolant sample and measures the flowability of electric current between the two electrodes. The method of this test is known to those skilled in the art. In the embodiment of the present invention, the electric conductivity was measured with a commercially available conductivity meter under the condition of 25° C. In the table of FIG. 2, Examples 1 through 9 are expressed as Ex. 1 to Ex. 9.

The discussion first regards the coolant of Comparative Example 1, which is conventionally used for cooling internal combustion engines of automobiles. The observed electric conductivity of Comparative Example 1 was 5960 (μS/cm), which was extremely higher than the observed values of electric conductivity of the respective Examples and the other Comparative Examples. This is ascribed to the presence of the strong electrolytes, that is, sodium hydroxide and sodium nitrate, as the additives in Comparative Example 1. Even a trace amount of the strong electrolyte significantly raises the electric conductivity. Sodium nitrate, sodium molybdate, and sodium benzoate are generally used rust-preventive agents, whereas sodium hydroxide and potassium hydroxide are generally used neutralizers.

Comparative Example 5 also contains various ions and accordingly showed the relatively high electric conductivity of 286 (μS/cm). Comparative Example 4, on the other hand, hardly contains any ions and accordingly showed the relatively low electric conductivity of 1.8 (µS/cm). Ion exchanged water (Comparative Example 6), which is conventionally used as a coolant for fuel cells, hardly contains any ions and accordingly showed the lowest electric conductivity of 0.88 (µS/cm).

The coolant of Example 2 showed the electric conductivity of 5.01 (µS/cm). This observed value of electric conductivity was sufficiently close to the electric conductivity 3.46 (µS/cm) of Comparative Example 2, which is the base material of the coolant of Example 2, and is relatively close to the electric conductivity 1.63 (µS/cm) of Comparative Example 3, which contains propylene glycol belonging to the glycols.

The coolant of Example 3 showed the electric conductivity of 2.11 (µS/cm). This observed value of electric conductivity was practically similar to the electric conductivity 3.46 (µS/cm) of Comparative Example 2, which is the base material of the coolant of Example 3, as well as to the electric conductivity 1.63 (µS/cm) of Comparative Example 3, which contains propylene glycol belonging to the glycols.

Addition of the electrolyte substances increasing the ion concentration in the solution as the additives generally enhances the electric conductivity. In the coolants of Examples 2 and 3, however, the variation in electric conductivity by the addition of the additives is negligible.

The coolants of Examples 4 and 7 respectively showed the electric conductivity of 5.3 (µS/cm) and 5.0 (µS/cm). These observed values of electric conductivity were sufficiently close to the electric conductivity 3.46 (µS/cm) of Comparative Example 2, which is the base material of the coolants of Examples 4 and 7.

The coolants of Examples 5, 6, 8, and 9 respectively showed the electric conductivity of 3.6 (µS/cm), 3.5 (µS/cm), 3.2 (µS/cm), and 4.4 (µS/cm). These observed values of electric conductivity were sufficiently close to the electric conductivity 3.46 (µS/cm) of Comparative Example 2, which is the base material of the coolants of Examples 5, 6, 8, and 9.

The rust-preventive additives used in Examples 4 to 9 are nonionic substances that are not ionized in the solution, and are theoretically expected to have an identical value of electric conductivity with that of the solvent. The results of the experiment prove that Examples 4 to 9 had the values of electric conductivity practically similar to or sufficiently close to the electric conductivity of the solvent. Namely in the coolants of Examples 4 to 9, the variation in electric conductivity by the addition of the additives is negligible.

The relationship between the quantity of addition of quercetin used as the rust-preventive additive in Example 4 and the electric conductivity is discussed with reference to FIG. 3. FIG. 3 is a graph showing a variation in electric conductivity due to addition of quercetin to a 50% diluted solution of ethylene glycol, with the quantity of addition of quercetin (ppm) as abscissa and the electric conductivity (µS/cm) as ordinate. As clearly understood from the graph of FIG. 3, the electric conductivity is approximately 5 to 6 (µS/cm) against the quantity of addition of quercetin up to 700 ppm. This is sufficiently close to the electric conductivity 3.5 (µS/cm) of the solvent (for example, Comparative Example 2), regardless of the quantity of addition. The electric conductivity continuously increases after the quantity of addition of quercetin exceeds 700 ppm. For example, the observed electric conductivity is about 7 (µS/cm) against the quantity of addition of quercetin equal to 1000 ppm. It is accordingly understood that quercetin, a nonionic substance, shows the sufficiently low electric conductivity, regardless of the quantity of addition and is a favorable rust-preventive additive for the coolant that requires the low electric conductivity.

The electric conductivity of Example 1 was 29.0 (µ/cm), which was higher than the values of electric conductivity of Comparative Examples 2 and 3 (5.01 (µS/cm), 3.46 (µS/cm)). This value was, however, 1/10 of the electric conductivity of Comparative Example 5 and less than 1/100 of the electric conductivity of Comparative Example 1.

In the coolants of Examples 1 to 3, pH is regulated by taking advantage of the acidic and alkaline characteristics of the selected rust-preventive additives. Compared with the technique using a pH regulator, this technique keeps the electric conductivity of the coolant at an extremely low level. The rust-preventive additives included in the coolants of Examples 4 to 9 are neutral nonionic substances, so that the electric conductivity of the coolant can be kept practically similar to the electric conductivity of the solvent without any pH regulation.

The following discussion regards comparison among results of the test for the passivation current density (passivation holding current) ($\mu A/cm^2$), which is the electric current passivating a sample metal. The test applied an aluminum material (AC2A) as the sample metal for one electrode and platinum for the other electrode, soaked both the electrodes in each of the coolants enumerated in the table of FIG. 1 (88° C., 300 ml), bubbled the coolant with $N_2$ at 10 ml/min, and made the coolant undergo deoxidation. The test then measured the value of electric current flowing between the two electrodes. The current density represents the intensity of electric current produced per unit area in the course of electrolysis of the sample metal. In general, the higher current density accelerates dissolution of the sample metal, which means corrosion. In this test, the higher current density represents the higher corrosion rate of the aluminum material.

In Examples 4 to 9 and Comparative Examples 2 to 4 whose observed values are shown in brackets in the table of FIG. 2, 50 ppm of $HCO_3^-$ was added as a supporting electrolyte for the measurement. Addition of 50 ppm of $HCO_3^-$ as the supporting electrolyte causes the dissolved $HCO_3^-$ (ion) to enhance the value of current density.

The measurement was performed in the flow of the air in Examples 1 to 3 and Comparative Examples 1 to 3 and 5.

Example 1 showed the passivation current density of 4.8 ($\mu A/cm^2$) in the flow of $N_2$ and 2.4 ($\mu A/cm^2$) in the flow of the air. Example 2 showed the passivation current density of 11 ($\mu A/cm^2$) in the flow of $N_2$ and 12 ($\mu A/cm^2$) in the flow of the air. Example 3 showed the passivation current density of 2.4 ($\mu A/cm^2$) in the flow of $N_2$ and 2.4 ($\mu A/cm^2$) in the flow of the air. Example 4, Example, 5, and Example 6 respectively showed the passivation current density of 7 ($\mu A/cm^2$), 15 ($\mu A/cm^2$), and 16 ($\mu A/cm^2$). Example 7, Example 8, and Example 9 respectively showed the passivation current density of 16 ($\mu A/cm^2$), 60 ($\mu A/cm^2$), and 80 ($\mu A/cm^2$).

Comparative Example 1, on the other hand, showed the passivation current density of 3.0 ($\mu A/cm^2$) in the flow of $N_2$ and 3.0 ($\mu A/cm^2$) in the flow of the air. Comparative Example 2 showed the passivation current density of 100 ($\mu A/cm^2$) in the flow of $N_2$ and 2.0 ($\mu A/cm^2$) in the flow of the air. Comparative Example 3 showed the passivation current density of 100 ($\mu A/cm^2$) in the flow of $N_2$ and 1.3 ($\mu A/cm^2$) in the flow of the air. Comparative Example 4 showed the passivation current density of 100 ($\mu A/cm^2$).

Comparative Example 5 showed the passivation current density of 76 ($\mu$A/cm$^2$) in the flow of N$_2$ and 210 ($\mu$A/cm$^2$) in the flow of the air.

The coolants of Examples 1 to 7 are little corrosive against the aluminum material, compared with Comparative Examples 2 and 5. Especially the coolants of Examples 4 to 7, irrespective of the presence of the supporting electrolyte, show the extremely low passivation current densities. This shows that these coolants are inherently little corrosive against the aluminum material.

The coolants of Examples 8 and 9 show the higher passivation current densities than the coolants of Examples 1 to 7, but are still less corrosive against the aluminum material than the coolants of Comparative Examples 2 and 4. The coolant of Comparative Example 1 without the supporting electrolyte shows the low passivation current density substantially equivalent to those of the coolants of Examples 1 to 3 without the supporting electrolyte. Comparative Example 1, however, has the extremely high electric conductivity and is thus not suitable for the coolant as discussed previously. Comparative Example 5 has the higher passivation current density and the higher electric conductivity than the coolants of Examples 1 to 3 and is thus not suitable for the coolant.

The following discussion regards comparison among the results of the metal corrosion resistance test. The test measured the quantity of corrosion (that is, the decrease in weight per unit area: mg/cm$^2$) of the aluminum material in each coolant after the aluminum material was left in each coolant heated to 88° C. in the flow of the air for 360 hours. The measurement was performed twice in the flow of the air in Examples 1 to 7 and Comparative Examples 1 to 3, 5, and 6, while being performed twice in the flow of N$_2$ in Examples 1 and 3 and Comparative Example 3. The negative values in the table given as the results of the metal corrosion resistance test mean that the aluminum material was corroded. The positive values mean that the aluminum material was not corroded but some substance was accumulated on the surface of the aluminum material.

Comparative Example 5, which is expected to be most corrosive, had the quantity of corrosion of –0.52 (mg/cm$^2$) in the first measurement and –0.43 (mg/cm$^2$) in the second measurement. Comparative Example 2, which is the base material of the respective Examples, had the quantity of corrosion of –0.12 (mg/cm$^2$) in the first measurement and 0.10 (mg/cm$^2$) in the second measurement. Comparative Example 3, which includes propylene glycol belonging to the glycols, had the quantity of corrosion of –0.12 (mg/cm$^2$) in the first measurement and 0.09 (mg/cm$^2$) in the second measurement.

Example 1, on the other hand, had the quantity of corrosion of 0.01 (mg/cm$^2$) in the first measurement and –0.01 (mg/cm$^2$) in the second measurement. Example 2 had the quantity of corrosion of –0.04 (mg/cm$^2$) in both the first and the second measurements. Example 3 had the quantity of corrosion of 0.04 (mg/cm$^2$) in the first measurement and 0.15 (mg/cm$^2$) in the second measurement. Example 4 had the quantity of corrosion of –0.02 (mg/cm$^2$) in the first measurement and 0.01 (mg/cm$^2$) in the second measurement. Example 5 had the quantity of corrosion of –0.02 (mg/cm$^2$) in both the first and the second measurements. Example 6 had the quantity of measurement of –0.03 (mg/cm$^2$) in the first measurement and –0.01 (mg/cm$^2$) in the second measurement. Example 7 had the quantity of measurement of 0.00 (mg/cm$^2$) in the first measurement and –0.02 (mg/cm$^2$) in the second measurement.

Examples 1 to 7 have the observed values all significantly lower than the observed value of Comparative Example 4, and have enhanced corrosion resistance, compared with Comparative Example 2, which is the base material of these Examples.

Comparative Example 6 had the quantity of corrosion of 0.10 (mg/cm$^2$) in both the first and the second measurements. Comparative Example 1 had the quantity of corrosion of –0.02 (mg/cm$^2$) in the first measurement and 0.03 (mg/cm$^2$) in the second measurement.

As clearly understood from the above comparison with Comparative Examples, the respective Examples had practically equivalent or less quantities of corrosion.

The following gives the observed quantities of corrosion in the flow of N$_2$ in Examples 1 and 3 and Comparative Example 3. Example 1 had the quantity of corrosion of 0.00 (mg/cm$^2$) in the first measurement and –0.01 (mg/cm$^2$) in the second measurement. Example 3 had the quantity of corrosion of 0.04 (mg/cm$^2$) in the first measurement and 0.05 (mg/cm$^2$) in the second measurement. Comparative Example 3 had the quantity of corrosion of 0.02 (mg/cm$^2$) in the first measurement and 0.04 (mg/cm$^2$) in the second measurement.

These observed quantities of corrosion in the flow of N$_2$ are compared with those in the flow of the air. Example 1 has substantially equivalent results, whereas Example 3 has similar results. In Comparative Example 3, on the other hand, the comparison shows that the flow of N$_2$ prevents the corrosion. The deoxidation process of blowing an inert gas, such as nitrogen (N$_2$), decreases the quantity of oxygen dissolved in the coolant and suppresses corrosion of the aluminum material. The deoxidation of the coolant, for example, with the nitrogen gas thus effectively prevents corrosion of the aluminum material, which is used as the material of the cooling circuit.

The above results of the comparison show that the coolant of Comparative Example 6, that is, conventionally used ion exchanged water (pure water), shows the favorable values for the electric conductivity and the quantity of corrosion. Ion exchanged water, however, freezes in the environment below the freezing point. In the case where ion exchanged water is applied for the coolant, an anti-freezing circuit should be provided and continuously driven in fuel cells, which may be placed in the environment below the freezing point. It is, however, difficult to provide the anti-freezing circuit in movable and intermittent-driving fuel cells. Namely ion exchanged water is unsuitable as the coolant for the movable and intermittent-driving fuel cells, which may be placed in the environment below the freezing point.

The coolant of Comparative Example 1, that is, the prior art coolant conventionally used for cooling internal combustion engines, has favorable unfreezing performance and rust resistance but extremely high electric conductivity, and is thus unsuitable as the coolant for cooling a stack of fuel cells, which is required to have low electric conductivity.

The coolants of Comparative Examples 2 and 3, that is, the coolants composed of the base material of Examples 1 to 3 or its equivalence, have favorable electric conductivity and unfreezing performance, but are still unsuitable as the coolant for cooling a stack of fuel cells from the viewpoint of the corrosion resistance (rust resistance).

The above results show that the compositions of Examples 1 to 9 are suitable as the coolant for a stack of fuel cells from the viewpoints of unfreezing performance, rust resistance, electric conductivity, and heat conductivity.

The measurements of pH and electric conductivity described above were carried out under the condition of 1 atm and 25° C. The measurements of metal corrosion resistance and passivation current density were carried out under the condition of 1 atm and 88° C. It is desirable to apply the additives to set pH in the range of about 6 to 9 and the electric conductivity of less than about 100 μS/cm under the working conditions, for example, at the pressure of 1 to 1.9 atm and at the temperature of −35° C. to 100° C.

Although the coolant of Example 3 used acidulous benzotriazole, an alkalescent ethanolamine additive may be used to regulate the rust-preventive ability, electric conductivity, and pH of the coolant to desired properties.

In Examples 1 to 9 and Comparative Examples 1 to 3, the freezing point was −30° C. In Comparative Examples 5 and 6, the freezing point was 0° C.

Second Embodiment

Figure 4:
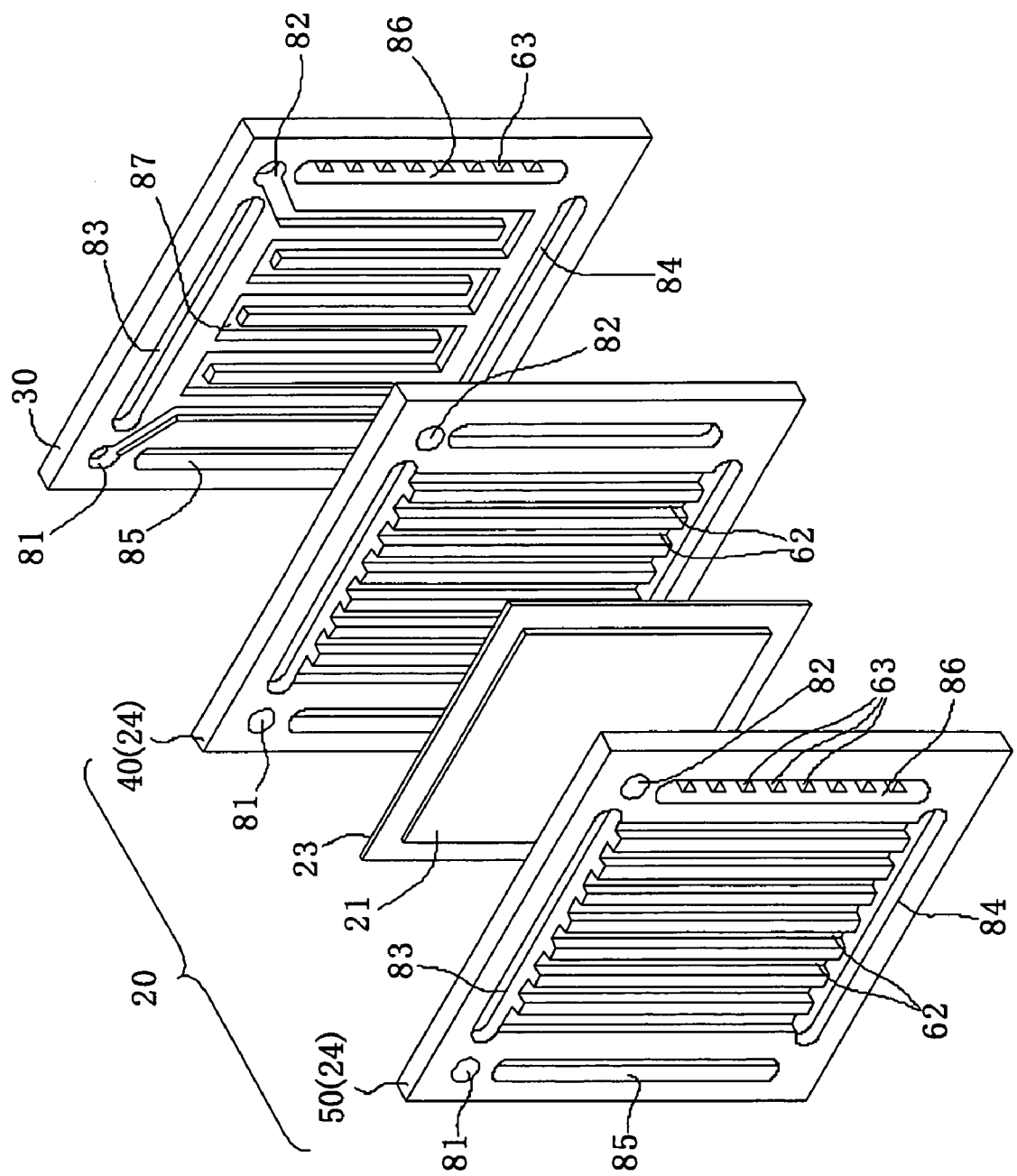
FIG. 4 illustrates the structure of a fuel cells stack cooling system in a second embodiment of the present invention.
Figure 5:
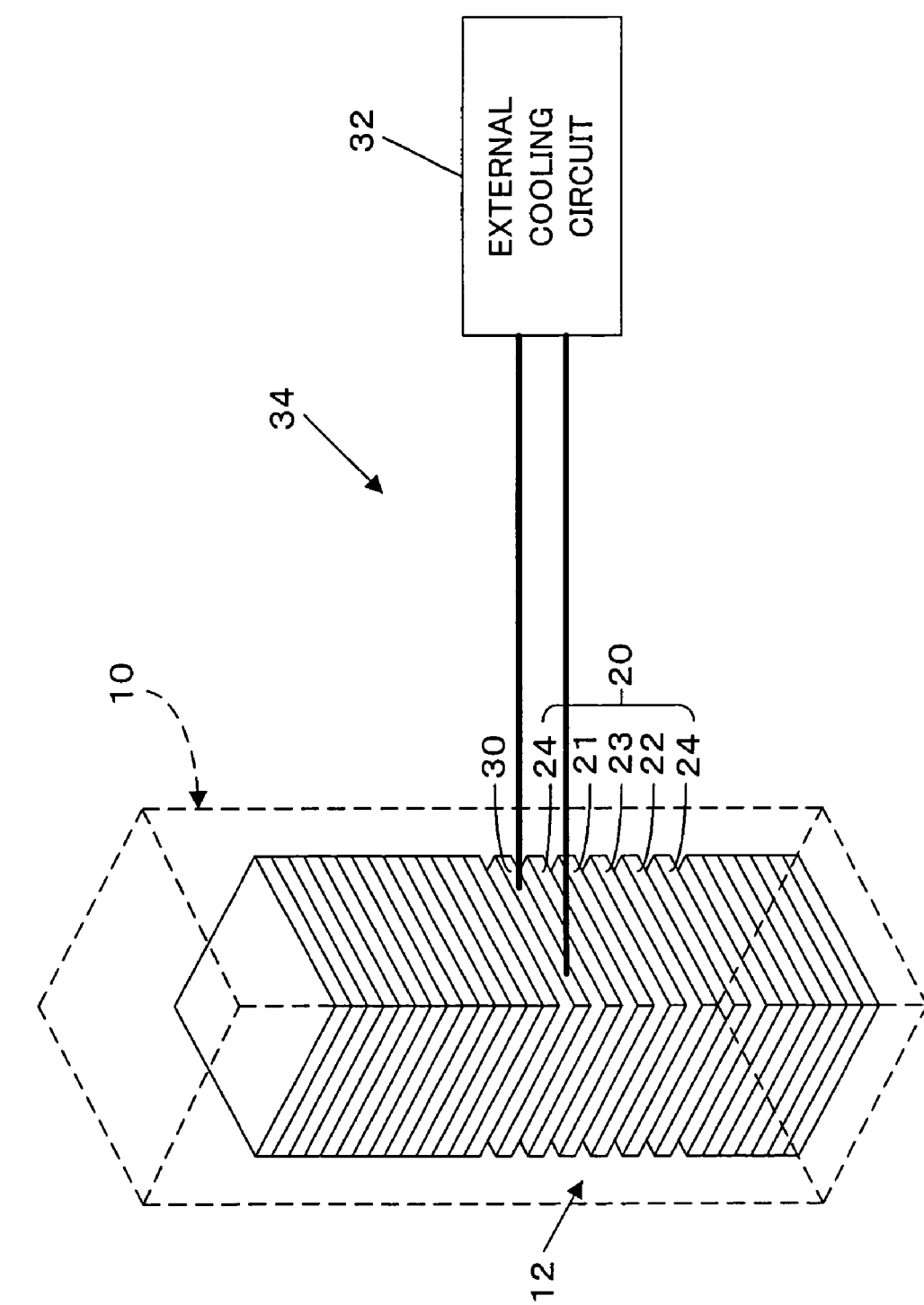
FIG. 5 is a decomposed perspective view showing the stack structure of unit cells 20.

A second embodiment of the present invention regards a fuel cells stack cooling system, which uses each of the coolants of the respective Examples according to the first embodiment as the cooling medium, with referring to FIGS. 4 and 5. FIG. 4 illustrates the structure of the fuel cells stack cooling system in the second embodiment of the present invention. FIG. 5 is a decomposed perspective view showing the stack structure of unit cells 20.

A stack 12 of fuel cells 10 is obtained by laying multiple unit cells 20 one upon another. Each unit cell 20 includes an air electrode 21, a fuel electrode 22, a matrix (electrolyte) 23 interposed between the air electrode 21 and the fuel electrode 22, and a pair of separators 24 composed of dense carbon and arranged outside the fuel electrode 22 and the air electrode 21. An aluminum cooling separator 30 is arranged on the separator 24 after every heap of multiple layers of the unit cells 20.

In this embodiment, the separator 24 is either one of an end separator 40 and a central separator 50. The cooling separator 30 and these separators 40 and 50 are formed as plates having square laminating faces. Coolant apertures 81 and 82 having circular cross section are formed at two different places in the circumference of the end separator 40 and the central separator 50 (that is, upper corners in FIG. 5). In the stack of fuel cells, the coolant apertures 81 and 82 form a flow path of the coolant, which passes through the stack in the laminating direction. A pair of gaseous fuel slots 83 and 84 and a pair of oxidizing gas slots 85 and 86 are formed along the respective sides in the circumferential part of the laminating face in each of the three different types of separators. In the stack of fuel cells, the gaseous fuel slots 83 and 84 and the oxidizing gas slots 85 and 86 respectively form a flow path for a hydrogen-containing gaseous fuel and a flow path for an oxygen-containing oxidizing gas, which pass through the stack in the laminating direction.

The cooling separators 30 are connected to an external cooling circuit 32 via a coolant flow path. The cooling separators 30 and the external cooling circuit 32 form a cooling circuit 34. A plurality of parallel grooves are formed as ribs 63 connecting the opposing oxidizing gas slots 85 and 86 in one face (the rear face in FIG. 5) of the cooling separator 30. In the stack of fuel cells, the ribs 63 are combined with the adjoining air electrode 21 to form a flow path for the oxidizing gas. A serpentine groove 87 is formed in the other face (the surface in FIG. 5) of the cooling separator 30 to connect the coolant apertures 81 and 82. In the stack of fuel cells, the cooling separator 30 adjoins to the end separator 40, and the groove 87 is combined with the flat surface of the end separator 40 to form a flow path for the coolant.

A plurality of parallel grooves are formed as ribs 62 connecting the opposing gaseous fuel slots 83 and 84 in one face (the surface in FIG. 5) of the end separator 40. In the stack of fuel cells, the ribs 62 are combined with the adjoining fuel electrode 22 to form a flow path for the gaseous fuel. The other face (the rear face in FIG. 5) of the end separator 40 is flat without any grooves.

A plurality of parallel grooves are also formed as the ribs 62 connecting the opposing gaseous fuel slots 83 and 84 in one face (the surface in FIG. 5) of the central separator 50. In the stack of fuel cells, the ribs 62 are combined with the adjoining fuel electrode 22 to form a flow path for the gaseous fuel. A plurality of parallel grooves are formed as the ribs 63 connecting the opposing oxidizing gas slots 85 and 86 in the other face (the rear face in FIG. 5) of the central separator 50. In the stack of fuel cells, the ribs 63 are combined with the adjoining air electrode 21 to form a flow path for the oxidizing gas.

The separators 24 (40 and 50) may be composed of a material having electric conductivity other than dense carbon. A metal like a copper alloy or aluminum alloy may be applied for the separators 24 to ensure the sufficient rigidity and heat transfer property.

Each of the coolants according to the first embodiment of the present invention (that is, the coolants of Examples 1 to 9) are used for the coolant in the cooling circuit. An inert gas, for example, nitrogen gas, is enclosed together with the coolant in the cooling circuit 34. The air present in the cooling circuit 34 and oxygen dissolved in the coolant are thus substituted by nitrogen gas to prevent deterioration of the coolant due to the dissolved oxygen. This is proved by the results of various test discussed in the first embodiment of the present invention.

Third Embodiment

Figure 6:
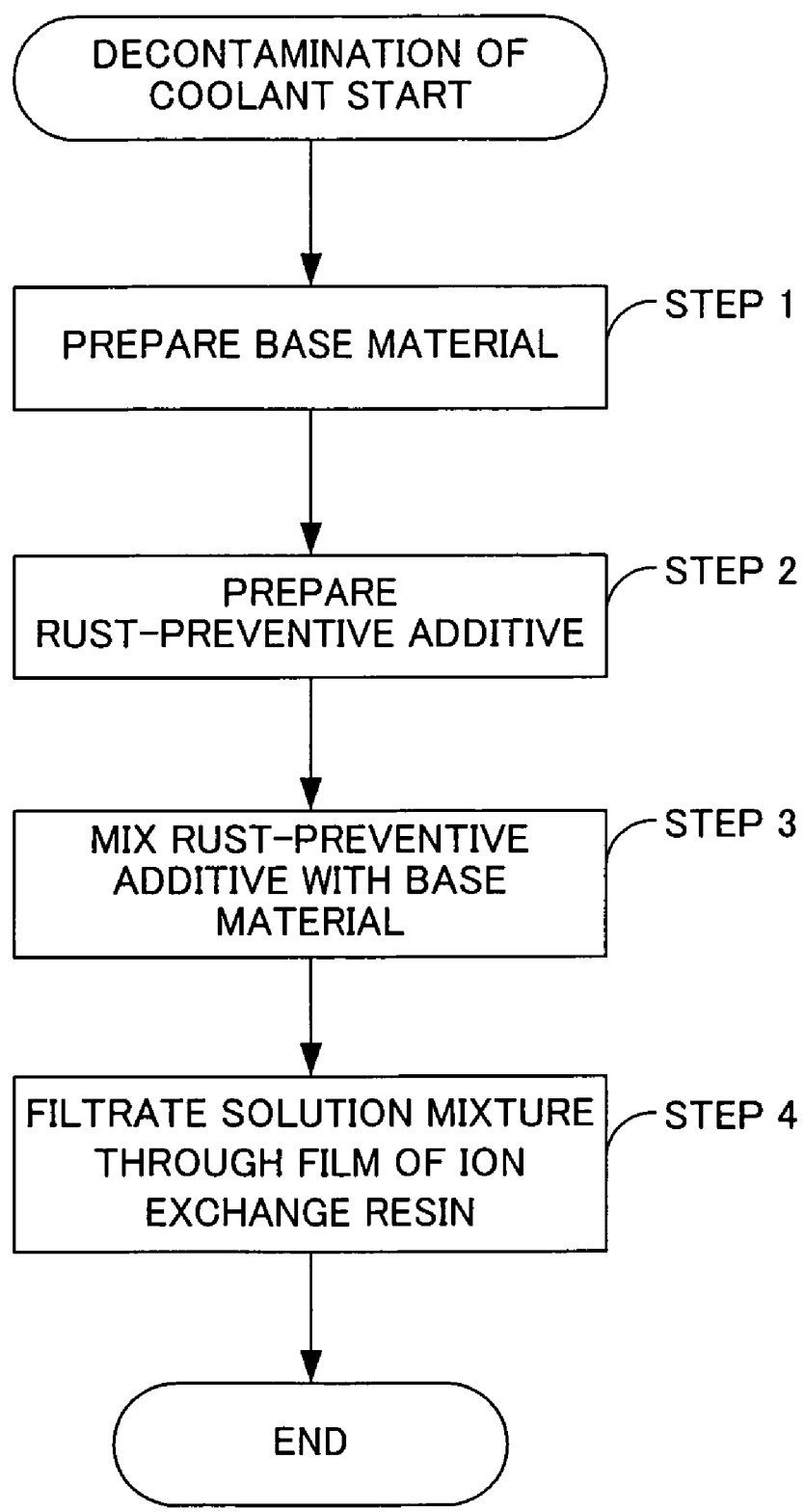
FIG. 6 schematically illustrates a process flow of manufacturing a coolant according to a first embodiment by a method in a third embodiment of the present invention.

A third embodiment of the present invention regards a method of manufacturing each of the coolants according to the first embodiment of the present invention with referring to FIG. 6. FIG. 6 schematically illustrates a process flow of manufacturing the coolant according to the first embodiment of the present invention.

The method first mixes ion exchanged water with ethylene glycol to prepare the base material. For example, the method prepares the base material to make the rate of ethylene glycol equal to 50% by weight in a resulting coolant, by taking into account the total quantity of the rust-preventive additive (step 1). The method then prepares the rust-preventive additive as a mixture of an alkaline additive and an acidic additive or the rust-preventive additive of a nonionic substance (step 2). Any of the chemical substances enumerated in the first embodiment of the present invention may be applied for the rust-preventive additive. For example, the rust-preventive additive of Example 1 is prepared by making the rates of triethanolamine and ortho-phosphoric acid respectively equal to 1.0% by weight and 0.1% by weight.

After preparing the base material and the rust-preventive additive, the method mixes the rust-preventive additive with the base material to prepare a solution (step 3). The method subsequently filtrates (decontaminates) the solution through a film of an ion exchange resin to remove the ionized substance from the solution (step 4). The solution decontaminated through the ion exchange resin film is each of the coolants according to the first embodiment of the present invention.

This manufacturing method gives preferable coolants for the stack of fuel cells, which satisfy the required unfreezing performance, rust resistance, electric conductivity, and heat conductivity.

The process of decontamination may use an ion exchange resin film, a fibrous ion exchange resin, or a column filled with particles of an ion exchange resin, through which the solution to be treated is filtered. Another applicable procedure stirs the solution of the base material and the rust-preventive agent with an ion exchange resin for a preset time period and makes the solution filtered through a PTFE filter film. Prior to the use of the ion exchange resin, it is desirable to treat the ion exchange resin with an acid solution (for example, concentrated hydrochloric acid), so as to remove metal ions adsorbed on the ion exchange resin.

The above description regards the coolants for fuel cells as the preferable embodiments of the present invention. These embodiments are, however, to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The rate of each component in the respective compositions given as the Examples according to the first embodiment of the present invention are only illustrative. For example, the desired unfreezing property, rust resistance, electric conductivity, and heat conductivity can be attained by triethanolamine in the range of 0.1 to 3.0% by weight, by ortho-phosphoric acid in the range of 0.1 to 1.0% by weight, by phosphonic acid in the range of 0.001 to 0.01% by weight, and by benzotriazole in the range of 0.1 to 0.6% by weight.

Some of the above Examples had the value of 6.2 or 8.1 for pH. Especially the aluminum material applied for the cooling circuit is not corroded at pH in the range of 6 to 9.

The construction of the fuel cells stack cooling system discussed above as the second embodiment of the present invention is only illustrative and not restrictive. The cooling system may have any construction, as long as the cooling system has any of the coolants according to the first embodiment of the present invention, which is enclosed with an inert gas and is used as the cooling medium of the cooling circuit.

In the embodiments of the present invention discussed above, pH of each coolant is adjusted with the rust-preventive additive on the assumption that the aluminum material is applied for the cooling circuit including cooling plates. Such specification, however, does not restrict the material of the cooling circuit to the aluminum material. In the case of another material, the desired pH should be attained with a rust-preventive additive suitable for the selected material.

The invention claimed is:

1. A coolant for fuel cells that is used to cool down fuel cells, comprising:
    a base material that is a water solution containing a glycol; and
    rust-preventive additives including an alkaline additive and an acidic additive;
    wherein the alkaline additive comprises at least one of triethanolamine, diethanolamine and monoethanolamine;
    wherein the acidic additive comprises phosphonic acid, at a concentration ranging from 0.001% to 0.01%; and
    wherein the coolant has an electric conductivity equal to or less than 100 $\mu$S/cm.

2. A coolant for fuel cells in accordance with claim 1, wherein the rust-preventive additive causes said coolant for fuel cells to have a hydrogen ion exponent of about 6 to 9.

3. A coolant for fuel cells in accordance with claim 1, wherein the rust-preventive additive has rust-preventive performance against aluminum material.

4. A coolant in accordance with claim 1, said coolant being decontaminated by a coolant decontamination system using either one of an ion exchange resin and a chelating resin.

5. A coolant in accordance with claim 1, said coolant having undergone deoxidation resulting in a reduction in the amount of oxygen in the coolant.

6. A method of enclosing a coolant in accordance with claim 1 in a cooling circuit for a stack of fuel cells, said method comprising:
    deoxidizing said coolant; and
    enclosing said deoxidized coolant with an inert gas in said cooling circuit.

7. A cooling system for a stack of fuel cells, said cooling system comprising:
    a coolant in accordance with claim 1; and
    a cooling circuit in which said coolant and an inert gas are enclosed.

8. The coolant according to claim 1, wherein the coolant is used in a fuel cell system.

* * * * *

UNITED STATES PATENT AND TRADEMARK OFFICE
CERTIFICATE OF CORRECTION

| | |
|---|---|
| PATENT NO. | : 7,344,655 B1 |
| APPLICATION NO. | : 10/049816 |
| DATED | : March 18, 2008 |
| INVENTOR(S) | : Mikito Nishii et al. |

It is certified that error appears in the above-identified patent and that said Letters Patent is hereby corrected as shown below:

The drawing consisting of figure 2, should be deleted to appear as per attached figure 2.

Signed and Sealed this

Sixteenth Day of June, 2009

JOHN DOLL
*Acting Director of the United States Patent and Trademark Office*

Fig. 2

| | Ex. 1 | Ex. 2 | Ex. 3 | Ex. 4 | Ex. 5 | Ex. 6 | Ex. 7 | Ex. 8 | Ex. 9 | Comparative Ex. 1 | Comparative Ex. 2 | Comparative Ex. 3 | Comparative Ex. 4 | Comparative Ex. 5 | Comparative Ex. 6 |
|---|---|---|---|---|---|---|---|---|---|---|---|---|---|---|---|
| Electric conductivity ($\mu$ S/cm) | 20.0 | 5.0 | 2.1 | 5.3 | 2.8 | 1.5 | 5.0 | 3.2 | 4.4 | 5850 | 3.5 | 1.6 | 1.8 | 286 | 0.88 |
| Metal corrosion resistance Air n=2 Quantity of corrosion of Al (mg/cm²) | 0.01 | -0.04 | 0.04 | -0.02 | -0.02 | -0.03 | 0.00 | - | - | -0.02 | -0.12 | -0.12 | - | -0.52 | 0.10 |
| | -0.01 | -0.04 | 0.15 | 0.01 | -0.02 | -0.01 | -0.02 | - | - | -0.03 | -0.10 | -0.09 | - | -0.43 | 0.10 |
| Metal corrosion resistance $N_2$ n=2 Quantity of corrosion of Al (mg/cm²) | 0.00 | - | 0.04 | - | - | - | - | - | - | - | - | 0.02 | - | - | - |
| | -0.01 | - | 0.05 | - | - | - | - | - | - | - | - | 0.04 | - | - | - |
| Passivation current density $N_2$ ($\mu$ A/cm²) | 4.8 | 11 | 2.4 | (7) | (15) | (18) | (18) | (80) | (80) | 3.0 | (100) | (100) | (100) | 78 | - |
| Passivation current density Air ($\mu$ A/cm²) | 2.4 | 12 | 2.4 | - | - | - | - | - | - | 3.0 | 2.0 | 1.3 | - | 210 | - |
| Freezing point (°C) | -35 | -35 | -35 | -35 | -35 | -35 | -35 | -35 | -35 | -35 | -35 | -35 | - | 0 | 0 |

UNITED STATES PATENT AND TRADEMARK OFFICE
CERTIFICATE OF CORRECTION

| | |
|---|---|
| PATENT NO. | : 7,344,655 B1 |
| APPLICATION NO. | : 10/049816 |
| DATED | : March 18, 2008 |
| INVENTOR(S) | : Mikito Nishii et al. |

It is certified that error appears in the above-identified patent and that said Letters Patent is hereby corrected as shown below:

The drawing consisting of figure 2, should be deleted to appear as per attached figure 2.

Under Electric conductivity Ex. 1, "29.0" has been changed to -- 290 --.

This certificate supersedes the Certificate of Correction issued June 16, 2009.

Signed and Sealed this
Thirty-first Day of July, 2012

David J. Kappos
*Director of the United States Patent and Trademark Office*

Fig. 2

| | Ex. 1 | Ex. 2 | Ex. 3 | Ex. 4 | Ex. 5 | Ex. 6 | Ex. 7 | Ex. 8 | Ex. 9 | Comparative Ex. 1 | Comparative Ex. 2 | Comparative Ex. 3 | Comparative Ex. 4 | Comparative Ex. 5 | Comparative Ex. 6 |
|---|---|---|---|---|---|---|---|---|---|---|---|---|---|---|---|
| Electric conductivity ($\mu$S/cm) | 290 | 5.0 | 2.1 | 5.3 | 3.6 | 3.5 | 5.0 | 3.2 | 4.4 | 5950 | 3.5 | 1.6 | 1.8 | 286 | 0.88 |
| Metal corrosion resistance Air n=2 Quantity of corrosion of Al (mg/cm$^2$) | 0.01 | -0.04 | 0.04 | -0.02 | -0.02 | -0.03 | 0.00 | — | — | -0.02 | -0.12 | -0.12 | — | -0.52 | 0.10 |
| | -0.01 | -0.04 | 0.15 | 0.01 | -0.02 | -0.01 | -0.02 | — | — | -0.03 | -0.10 | -0.09 | — | -0.43 | 0.10 |
| Metal corrosion resistance N$_2$ n=2 Quantity of corrosion of Al (mg/cm$^2$) | 0.00 | — | 0.04 | — | — | — | — | — | — | — | — | 0.02 | — | — | — |
| | -0.01 | — | 0.05 | — | — | — | — | — | — | — | — | 0.04 | — | — | — |
| Passivation current density N$_2$ ($\mu$A/cm$^2$) | 4.8 | 11 | 2.4 | (7) | (15) | (16) | (16) | (60) | (80) | 3.0 | (100) | (100) | (100) | 76 | — |
| Passivation current density Air ($\mu$A/cm$^2$) | 2.4 | 12 | 2.4 | — | — | — | — | — | — | 3.0 | 2.0 | 1.3 | — | 210 | — |
| Freezing point (°C) | -35 | -35 | -35 | -35 | -35 | -35 | -35 | -35 | -35 | -35 | -35 | -35 | — | 0 | 0 |